United States Patent [19]

Thieret et al.

[11] Patent Number: 5,225,856

[45] Date of Patent: Jul. 6, 1993

[54] METHOD AND APPARATUS FOR CORRECTION OF BLOOMING ARTIFACTS IN IONOGRAPHIC DEVICES

[75] Inventors: Tracy E. Thieret, Webster; Jeffrey J. Folkins, Rochester, both of N.Y.; Richard G. Stearns, Mountain View; William B. McDonald, III, Sunnyvale, both of Calif.

[73] Assignee: Xerox Corporation, Stamford, Conn.

[21] Appl. No.: 812,325

[22] Filed: Dec. 23, 1991

[51] Int. Cl.$^5$ ............................................. G01D 15/06
[52] U.S. Cl. ................................... 346/159; 346/1.1
[58] Field of Search .................................. 346/159, 1.1

[56] References Cited

U.S. PATENT DOCUMENTS

| | | | |
|---|---|---|---|
| 4,463,363 | 7/1984 | Gundlach et al. | 346/159 |
| 4,524,371 | 6/1985 | Sheridon et al. | 346/159 |
| 4,538,163 | 8/1985 | Sheridon | 346/155 |
| 4,644,373 | 2/1987 | Sheridan et al. | 346/159 |
| 4,737,805 | 4/1988 | Weisfield et al. | 346/159 |
| 4,794,412 | 12/1988 | Casey et al. | 346/154 |
| 4,972,212 | 11/1990 | Hauser et al. | 346/159 |
| 4,973,994 | 11/1990 | Schneider | 346/159 |
| 4,982,342 | 1/1991 | Moribe et al. | 364/518 |
| 5,081,475 | 1/1992 | Frank et al. | 346/159 |
| 5,081,528 | 1/1992 | Hayashi et al. | 358/75 |
| 5,087,933 | 2/1992 | Stearns | 346/159 |
| 5,089,887 | 2/1992 | Robert et al. | 358/105 |

*Primary Examiner*—Benjamin R. Fuller
*Assistant Examiner*—Randy W. Gibson
*Attorney, Agent, or Firm*—Mark Costello

[57] ABSTRACT

To correct for blooming artifacts in an ionographic imaging device, a summation of the effects of previously deposited charge is made prior to depositing ions to form the image, to determine the likely amount of displacement of any ion due to a previously deposited charge. A comparison of the displaced pixel position, with the desired image is made to determine where the ions will fall. If the ions are predicted to fall within an area in which ion deposition is desired, ions are allowed to pass to the imaging surface. If the comparison of the displaced pixel position with the desired image is made and predicts that ions will fall outside of an area in which charge is desired, ions are prevented from passing to the image surface.

72 Claims, 5 Drawing Sheets

METHOD AND APPARATUS FOR CORRECTION OF BLOOMING ARTIFACTS IN IONOGRAPHIC DEVICES

The present invention relates generally to controlling the formation of blooming artifacts in ionographic devices, and more particularly, to predicting displacement of each pixel due to the electrostatic force exerted thereon by previously deposited charge, and controlling the printing operation by comparison of determined displacement and the desired image.

INCORPORATION BY REFERENCE

U.S. Pat. No. 4,524,371 to Sheridon et al., U.S. Pat. No. 4,463,363 to Gundlach et al., U.S. Pat. No. 4,538,163 to Sheridon, U.S. Pat. No. 4,644,373 to Sheridan et al., U.S. Pat. No. 4,737,805 to Weisfield et al, are incorporated by reference for their teachings.

BACKGROUND OF THE INVENTION

In ionographic devices such as that described by U.S. Pat. No. 4,524,371 to Sheridon et al. or U.S. Pat. No. 4,463,363 to Gundlach et al., an ion producing device generates ions to be directed past a plurality of modulation electrodes for deposit on an imaging surface in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other inographic devices exist which operate similarly, but do not not rely on a moving fluid stream to carry ions to a surface.

One problem affecting the control of image quality in ionographic devices is known as "blooming". Blooming is an unavoidable phenomenon resulting from the effect of previously deposited ions or charge on the path of subsequent ions directed to the charge retentive surface. The problem is particularly noticeable when printing characters and edges of solid areas, resulting in character defects known as "rocking chair bottoms" (FIG. 1A), "undercutting" (FIG. 1B) and "trapezoids" (FIG. 1C), (with input bit maps shown in dashed lines). For an ionographic printing system where the source of the modulated ion stream is spaced approximately 10 mils from the imaging surface, and having an approximately 1100 volt image potential, the blooming artifacts noted may include a pixel displacement of 1-2 pixels distance, which in a 300 spot per inch printing system would be about 67 microns. While closer spacing of the ion stream source would reduce the effect, the spacing is limited by mechanical and printing requirement, including surface runout.

SUMMARY OF THE INVENTION

In accordance with the invention, in an ionographic printing system, there is provided a method and apparatus predicting the displacement of each pixel to be deposited on an imaging surface due to the electrostatic force exerted thereon by previously deposited charge, and controlling the printing operation by comparison of the determined displacement and the desired image.

In accordance with one aspect of the invention, a summation of the effects of previously deposited charge is made prior to depositing ions to form the image, to determine the likely amount of displacement of any ion due to previously deposited charge. A comparison of the displaced pixel position with the desired image is made to determine where the ions will fall. If the ions are predicted to fall within an area in which ion deposition is desired, ions are allowed to pass to the imaging surface. If the comparison of the displaced pixel position with the desired image is made and predicts that ions will fall outside of an area in which charge is desired, ions are prevented from passing to the image surface.

In accordance with another aspect of the invention, in an ionographic system that provided for printing pixels with gray levels, or multiple charge levels, a summation of the effects of previously deposited charge is made prior to depositing ions to form the image, to determine the likely amount of displacement of the pixel due to the previously deposited charge. A comparison of the displaced pixel position with the desired image is made to determine whether the ions will fall within an area in which charge is desired. If the ions are predicted to fall within an area in which charge is desired, ions are allowed to pass to the imaging surface. If the comparison of the displaced pixel position with the desired image is made predicts that the ion will fall outside of an area in which charge is desired a calculation is made to determine how far outside the area the ions will fall. A factoring process is used which decreases the intensity or level of gray of the pixel in accordance with increasing distance from the desired image area.

These and other aspects of the invention will become apparent from the following description used to illustrate a preferred embodiment of the invention read in conjunction with the accompanying drawings in which:

FIGS. 1A, 1B, and 1C demonstrate blooming artifacts noted in ionographic printing;

FIG. 2 schematically shows an ionographic print head of the type contemplated for use with the present invention, in printing relationship with an imaging surface;

Figure 1A:
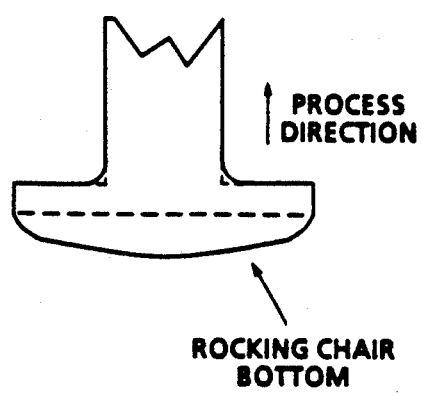
Figure 1B:
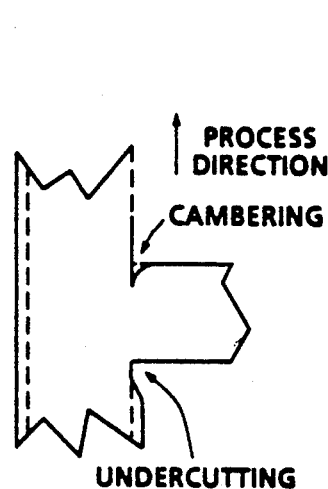
Figure 1C:
Figure 2:
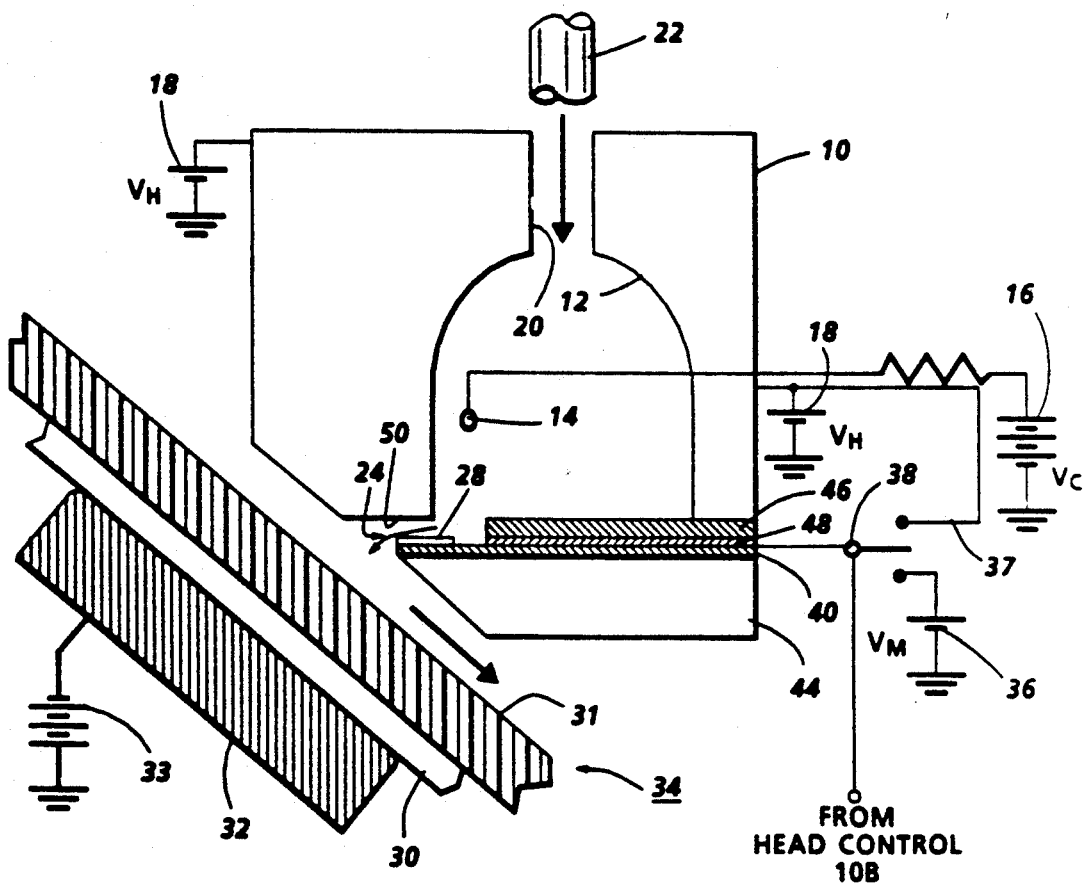

With reference now to the drawings where the showings are for the purpose of illustrating an embodiment of the invention and not for limiting same, FIG. 2 shows a schematic representation of a cross section of the marking head 10 of a fluid jet assisted ionographic marking apparatus similar to that described in commonly assigned U.S. Pat. No. 4,644,373 to Sheridan et al.

Within head 10 is an ion generation region including an ion chamber 12, a coronode 14 supported within the chamber, a high potential source 16, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air into chamber 12 from a suitable source, schematically illustrated by tube 22. A modulation channel 24 conducts the transport fluid out of the chamber from ion chamber 12 to the exterior of the head 10. As the transport fluid passes through ion chamber 12, it entrains ions and moves the ions into modulation channel 24, past modulation electrodes 28. The interior of ion chamber 12 may be provided with a coating that is inert to the highly corrosive corona byproducts produced therein.

Ions allowed to pass out of head 10, through modulation channel 24, and directed to charge receptor 34, come under the influence of a conductive plane 30, provided as a backing layer to a charge receptor dielectric surface 31, with conductive plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown).

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 and a reference potential 37 by means of a switch 38. While the switching arrangement shown produces a binary imaging function, gray levels may be provided by providing a continuously variable voltage signal to the modulation electrodes. The modulation electrodes are arranged on a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36, may be applied, when connected through switch 38. Thus, an electric field, extending in a direction transverse to the direction of the transport fluid flow, is selectively established between a given modulation electrode 28 and the opposite wall 50.

"Writing" of a selected spot is accomplished by connecting a modulation electrode to the reference potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation voltage is applied to an electrode. This is accomplished by connecting the modulation electrode 28 to the low voltage potential of source 36 via switch 38 so as to impose upon the electrode a charge of the same sign as the ionic species. The ion "beam" will be repelled and be driven into contact with the opposite, conductive wall 50 where the ions neutralize into uncharged, or neutral air molecules. Thus, an imagewise pattern of information is formed by selectively controlling each of the modulation electrodes on the marking array so that the ion "beams" associated therewith either exit or are inhibited from exiting the housing, as desired. For simplicity and economy of fabrication over the large area, full page-width head, thin film techniques are used. Thin film silicon, in either the amorphous, polycrystalline or microcrystalline forms, has been the material of choice for the active devices. The relatively low temperature of the amorphous silicon and polysilicon fabrication processes allows a large degree of freedom in the choice of substrate materials, enabling the use of inexpensive amorphous materials such as glass, ceramics and possibly some printed circuit board materials.

As an alternative to an ionographic printing head with fluid jet assisted ion flow, it will no doubt be appreciated that other ionographic print heads may be provided where the the ion stream could be field directed to the charge receptor. Further, while the description herein assumes positive ions, appropriate changes may be made so that negative ions may be used.

Before proceeding further, several definitions are desirable. A pixel represents the smallest element defining an image. In an ionographic system, a pixel is formed by the deposit of ions over a relatively small area, or a pixel location, on an imaging surface. A bitmap is a representation of the image in terms of pixels, where pixel are arranged in scan lines, which are formed by the relative movement of the print head and the imaging surface. A pixel has a pixel value, which may be binary (either on or off, 1 or 0) or gray (a value between minimum and maximum, or white and black). Ionographic systems stand out from other electrophotographic systems by having a particularly useful gray level printing capability.

Figure 3:
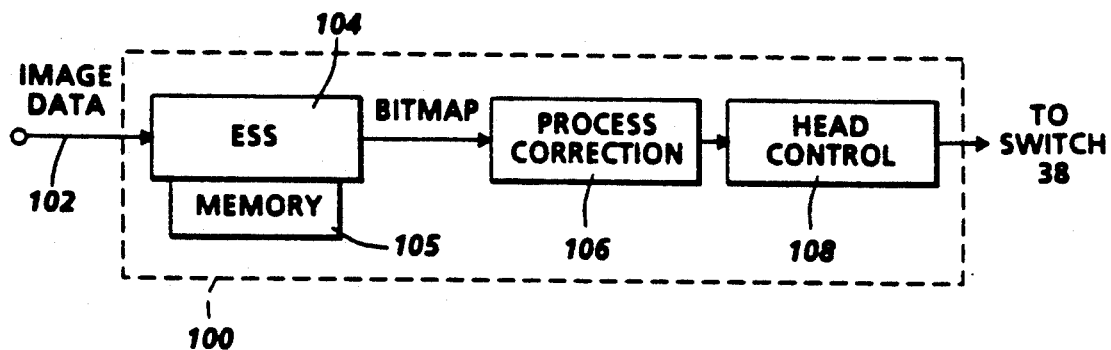
FIG. 3 shows a generalized system block diagram demonstrating the use of the process correction obtained from the present invention.

With reference now to FIG. 3, in a printing system including the present invention for predicting displacement (blooming) of each pixel due to the electrostatic force exerted on the ion beam forming the pixel by previously deposited charge, and controlling the printing operation by comparison of determined displacement and the desired image, the system provides a print controller 100, controlling the operations of the printer, and including an image data input 102, which receives image data in a high level page description format or bitmap format, an ESS 104 that performs conversion of the data from the page description format to bitmap format suitable for printing, and any other editing, formatting or filtering functions that may be accomplished in the printer, and a memory 105 storing programs for operation of the printer, print information, etc. for use by the ESS. Upon converting the information to bitmap format, the ESS transfers bitmap data or pixels to the process correction device 106, where the bitmap is "pre-distorted" to correct for unwanted image displacement, i.e., blooming. It therefore will be appreciated that the bitmap is corrected for blooming regardless of the image content, and irrespective of font or image type. The bitmap corrected for printing process distortions is then passed to the head control 108 which controls the signals directed to controllable switch 38.

Figure 4:
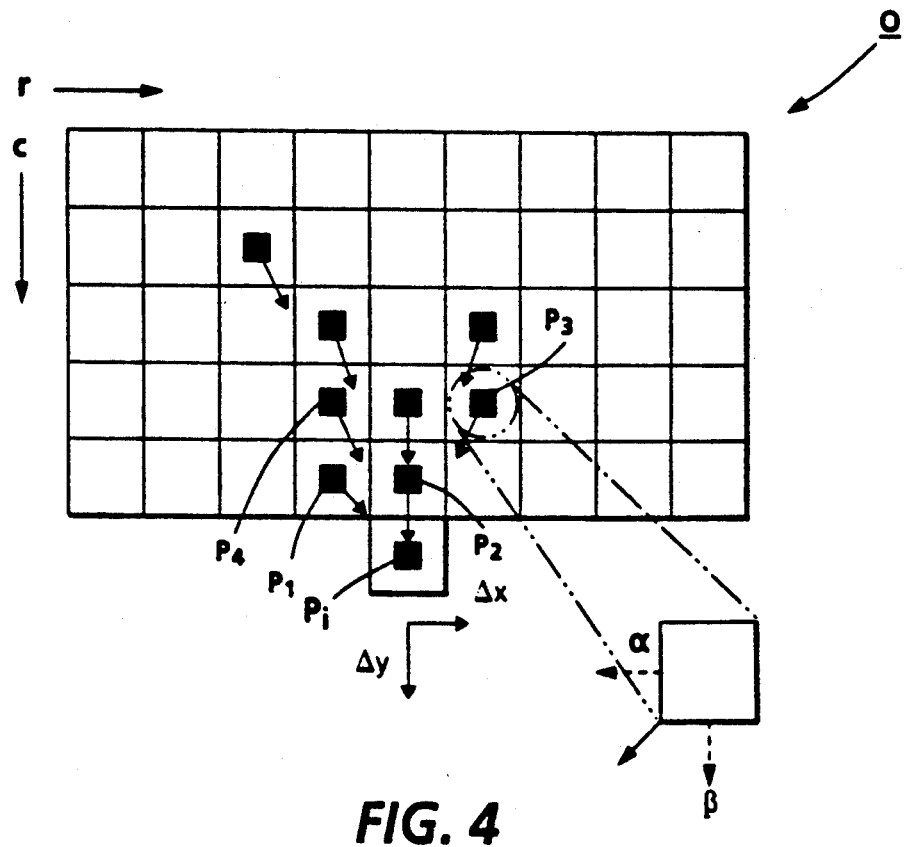
FIG. 4 shows the general theory of the present invention.

FIG. 4 shows the conceptual basis for the determination of pixel displacement. A given pixel to be printed, $P_i$, will be printed on an imaging surface by ions projected by the ion head to the imaging surface at a pixel location in accordance with a bitmap image, as described. However, in the printing process, ions directed to the imaging surface to print pixel $P_i$ are deflected or displaced by the charge associated with previously printed pixels, for example $P_1, P_2, P_3, P_4$. Within a selected area of concern, defined by matrix O, the number of pixels, and accordingly the magnitude and direction of charge affecting $P_i$, varies in accordance with the image being printed. The displacement of $P_i$ from its intended position on the imaging surface, due to the previously deposited ions or pixel charge can be derived by summing the vector quantities of the displacement of charge associated with each pixel, within the area of interest, on pixel $P_i$, a relation given by $$\Delta y1 = \Sigma_{r,c} \beta_{r,c} O_{r,c} \qquad (1)$$

and $$\Delta x = \Sigma_{r,c} \alpha_{r,c} O_{r,c} \qquad (2)$$

Where $\Delta x$ and $\Delta y$ are, respectively, displacement in of pixel $P_i$ in fast scan and slow scan directions on the imaging surface; $\beta_{r,c}$ is the displacement of pixel $P_i$ in the y-direction, due to a previously deposited pixel at row r and column c within the selected area of concern;

$\alpha_{r,c}$ is the displacement of pixel $P_i$ in the x-direction, due to a previously deposited pixel ar row r and column c within the selected area of concern.

r and c are, respectively, rows and columns in the matrix O; and O is the occupancy matrix, which represents the value of a pixel at a given position in the matrix.

The values of the force coefficients $\alpha$ and $\beta$ are determined empirically by the device geometry (e.g., head to image surface spacing), as well as the values of projection electric field strength, ion current and dielectric thickness of the image surface or receiver. In addition or alternatively, by computation of the electric field strength above the imaging surface for a given device configuration, the path of the ions from the print head to the imaging surface may be theoretically calculated. One such calculation produced a result for the deflection of pixel $P_i$, due to a single pixel in the selected area of concern, which could be fitted well by the simple relation:

$$\delta r = \frac{A}{r'} e^{-r/r_c'}$$

Where:

$\delta r$ is the deflection (in both x and y directions) of the pixel $P_i$ to be printed, due to a single previously deposited pixel in the area of concern. $\delta r$ is always directed such that pixel $P_i$ is deflected directly away from the single pixel;

A is a scale factor determined by device characteristics that indicates the magnitude of the blooming function;

$r_c'$ is a parameter associated with the spacing between the head and receptor;

r' is the distance from the previously deposited single pixel (e.g. at row r and column c) to the location of pixel $P_i$.

For each pixel associated with the matrix O, it is straightforward to calculate the displacements $\delta r$ of pixel $P_i$ due to that pixel, from the above relation, and to decompose this deflection into the coefficients $\alpha$ and $\beta$ of Eqs. (1) and (2). The size of occupancy matrix O or the selected area of interest is determined primarily by the spacing of the print head to the imaging surface.

Electric fields in an ion print head and imaging surface configuration approximate those in a parallel plate electric field model, in which the electric field affects only regions within a radius approximating the distance between the plates. One working embodiment of the invention has been used in a device having a 5 pixel head to surface spacing, and so in the following example, a 5×9 matrix will be assumed, although many other sizes can be selected. Another way of determining the area of concern would be to determine empirically the size of an area in which deposited pixels have a non-negligible or substantial effect on the placement of pixel $P_i$.

In certain cases where the head to surface spacing is large compared to this example, and/or where the blooming effect is large, it may be desirable to provide a larger matrix O over which the effects of previously deposited charge are considered. However, the additional size of the matrix will create computational difficulties. Accordingly, a scheme may be provided that combines the effects of charge deposited at groups of pixel locations relatively far from the pixel in consideration, prior to calculation of the displacement, while using the charge of individual pixels locations relatively close to the pixel in consideration, in the displacement calculation scheme.

The displacement of the current ion beam should be calculated based on the actual positions of previously deposited pixels, as opposed to bitmap position. Since these pixels have themselves been corrected for blooming, the difference is certainly small.

Figure 5:
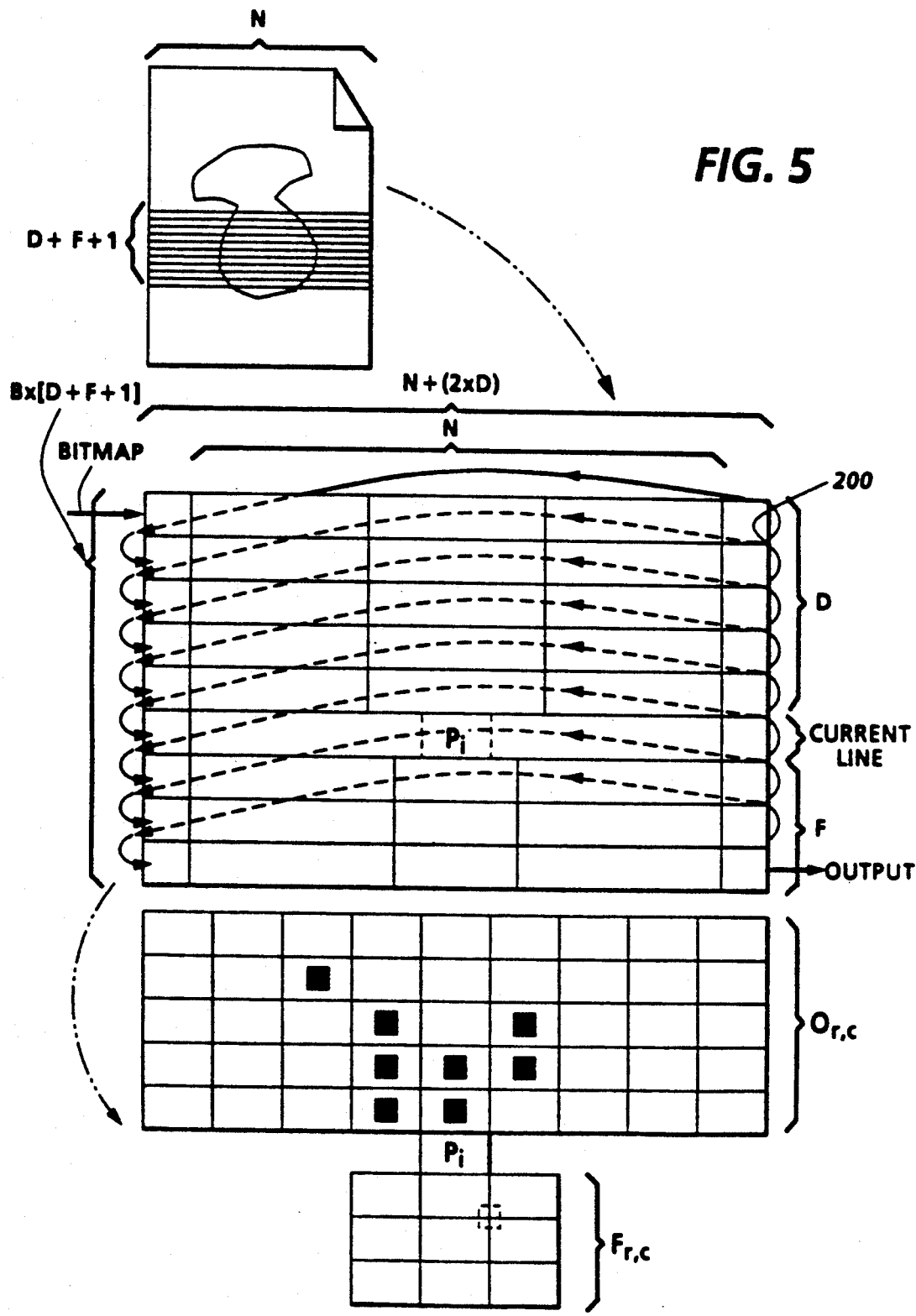
FIG. 5 shows how image data is handled in one embodiment of the present invention.
Figure 6:
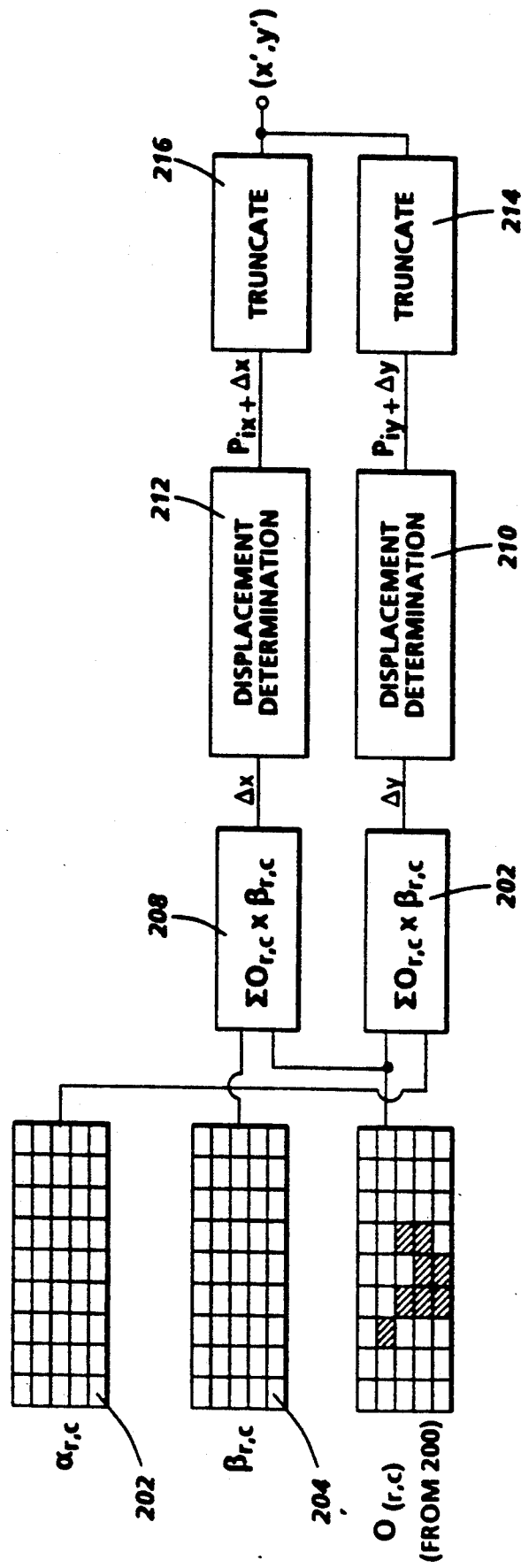
FIG. 6 shows the derivation of displacement data.

In accordance with FIG. 5, a circuit is schematically shown as part of the determination of displacement values $\Delta x$ and $\Delta y$. A multiple bit spiral shift register 200 (in which matrix O can be defined as a window defining a selected area of interest, as will be described further) has a number of entries for each scan line given as $N + (2 \times D)$ where N is the total number of nibs in the printhead and D is the effective radius of the blooming phenomenon, or, the distance over which pixels already written on the receiver have a non-negligible affect on the trajectory of a pixel. In the example, the shift register has 2550 nibs, and D is given as five pixels. The explanation for this aspect of the size of the storage is that data from every pixel (N) in a number of scan lines must be retained for use in subsequent calculations. The extra 2×D amount is to account for the edges of the scan line. These 2×D values in each scan line are set equal to zero since there are no pixels there—they are outside of the image area. The presence of these extra "place holders" permits the shift register to wrap around. When the calculation gets to the end of a scan line, if these place holders were not present, data from the beginning of the next scan line would be included in the calculation for the end of the current line giving rise to errors. A more difficult way of coping with this problem would be to recognize the end of scan and alter the technique to handle the wrap around. Using the proposed method permits all calculations to proceed alike. The spiral register is a technique to reduce the number of random (slow) memory accesses by the $\Delta x$ and $\Delta y$ calculation. The value of the arrangement is in keeping useful information from previous calculations, and replacing only unnecessary information with new data for the current calculation.

The formula which applies to the number of scan lines which need to be retained in the spiral register, and their pixel depth, is given by $[B \times (D + F + 1)]$. The calculation of displacement requires historical information about pixels already printed. Once again, the charge associated with pixels already printed in the selected area up to D lines back, affect the current pixel. Thus, to calculate the effect, the pixel values are stored in the shift register. This accounts for the "D" in the number of scan lines to be retained. Pixels always bloom in the forward or process direction. The main thrust of the arrangement is to calculate where the pixel will land and see if the image has a pixel there. In order to reference scan lines which have not yet been printed, the future scan lines of pixels must be stored somewhere. The "F" in the above expression refers to number of these future scan lines of pixel which have not yet been printed. The "1" in the formula counts the current scan line of pixels. Since the printer is capable of gray, there is more than one bit per pixel to represent the intensity. Thus each of the elements must be "B" bits in size to represent the pixel value.

While as described herein, the process considers the effect only of previous scan lines, previously printed pixels in the current scan line (holding the pixel to be printed) could also be considered.

Shift registers work by entering data in at one end and pulsing the device to move the data into the device and prepare the device for the next data. At the other end of the device, the data come out in the same order but delayed in time (measured by the pulses) by the number of stages within. In this case a parallel shift register is proposed with stages corresponding to the number of individual nibs N in the printhead plus the guard bits ($2 \times D$). The output end is connected into the input end to make the device "spiral." A set of taps into the shift register 200 is provided at positions corresponding to matrix O, to create a "window" on the bitmap, so that the pixel values can readily be directed onward.

$$\frac{E_x}{r^2} \text{ and } \frac{E_y}{r^2} \quad (3), (4)$$

Stored at each position in second and third registers 202 and 204 are the displacement coefficient values $\alpha_{r,c}$ and $\beta_{r,c}$, predetermined by empirical measurement, theoretical analysis, or a combination of the two. For determination of displacement of each pixel $P_i$, each $\alpha_{r,c}$ is summed at summing circuit 206. Likewise each $\beta_{r,c}$, from $\beta_{1,1}$ to $\beta_{j,k}$ is summed at summing circuit 208. The output of summers 206 and 208 are signals proportional to the displacements $\Delta x$ and $\Delta y$. A displacement determination function is required, to convert displacement values, which are in terms of pixel values, to pixel size units, or pixel distances, which are then added to the position of $P_i$. Thus, the output of displacement determination 210 and 212 is a position in term of pixels, $P_{ix} + \Delta x$ and $P_{iy} + \Delta y$, which indicates the location in the bitmap where ions forming pixel $P_i$ will actually land. Since this pixel location value is compared to a location of a future pixel in the bitmap, for ease of processing it is rounded or truncated at truncation 214 and 216 to provide an integer value pixel location x',y', which defines the center of the pixel at which ions will land. For gray printing, a weighting function is applied, if the landing position $P_{ix} + \Delta x$ and $P_{iy} + \Delta y$ is near an edge or change of intensity of the desired image. This weighting function is dependent on the distance of the predicted landing position from each of four pixel centers surrounding the landing position. While a number of approaches may be used, one approach is to begin with $P_{ix} + \Delta x$ and $P_{iy} + \Delta y$, which are likely to be non-integer values, because ions fall and overlap a region including up to four pixels. The locations of these four pixel are integers, and calculated by:

| | | |
|---|---|---|
| $X_1 = [X_p]$ | $Y_1 = [Y_p]$ | Where [q] is obtained by removing or truncating the fractional part of q, commonly referred to as the "floor" of q. |
| $X_2 = X_1 + 1$ | $Y_2 = Y_1$ | |
| $X_3 = X_1$ | $Y_3 = Y_1 + 1$ | |
| $X_4 = X_1 + 1$ | $Y_4 = Y_1 + 1$ | |

Thus, the gray level value may be calculated as $$\text{gray level} = \sum_{i=1}^{4} O_i \times [(x_i - x_p)^2 + (y_i - y_p)^2]^{\frac{1}{2}}$$

Where N is a normalization constant to scale the values; and $O_i$ is the occupancy matrix of the i, $j^{th}$ pixel (where 1 is "ON", or black in the image, and zero is "OFF" or white within the image area of the occupancy matrix) Other formulas may be used. This particular choice is based on relative distance from each of the pixels i, j. Notice that at least one of the $O_{i,j}$ will be equal to zero at an edge, but the formula is a general one, even for a non-edge case.

Figure 7A:
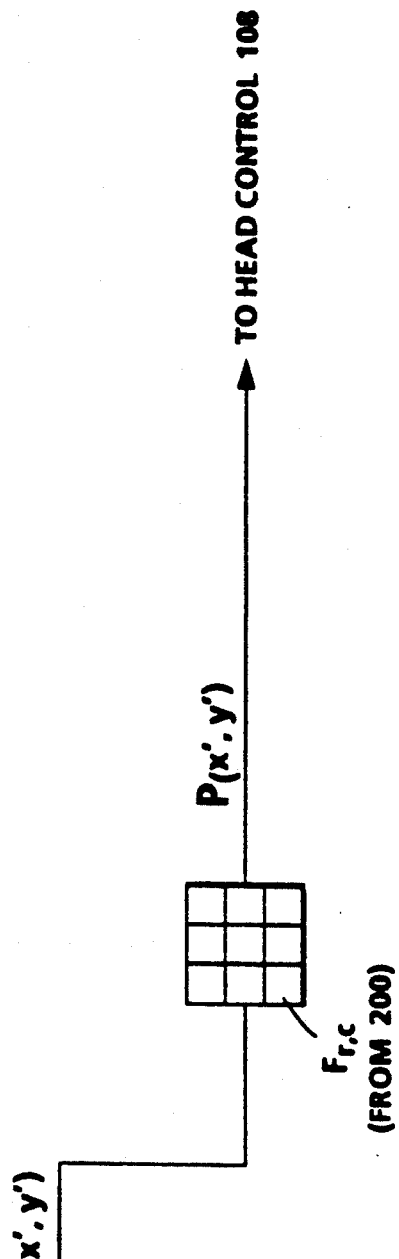
FIGS. 7A and 7B show a portion of a system in which the present invention finds use, in which the derived displacement data is implemented.

With reference now to FIG. 7A, once x', y' have been determined, landing location is compared to the bitmap of the image, which is stored in the portion of the ring register (in FIG. 5) labeled future pixels, or $F_{r,c}$. The value of the future pixel P(x',y') at location x',y' is copied to the output to head control 108 (FIG. 3). Thus, a table of outputs shows the results of the invention. Thus, it may be seen that the invention attempt to prevent additional pixels from being printed in locations.

| r,c | x'y' | Output |
|---|---|---|
| 0 | 0 | 0 |
| 1 | 0 | 0 |
| 0 | 1 | 1 |
| 1 | 1 | 1 |

Figure 7B:
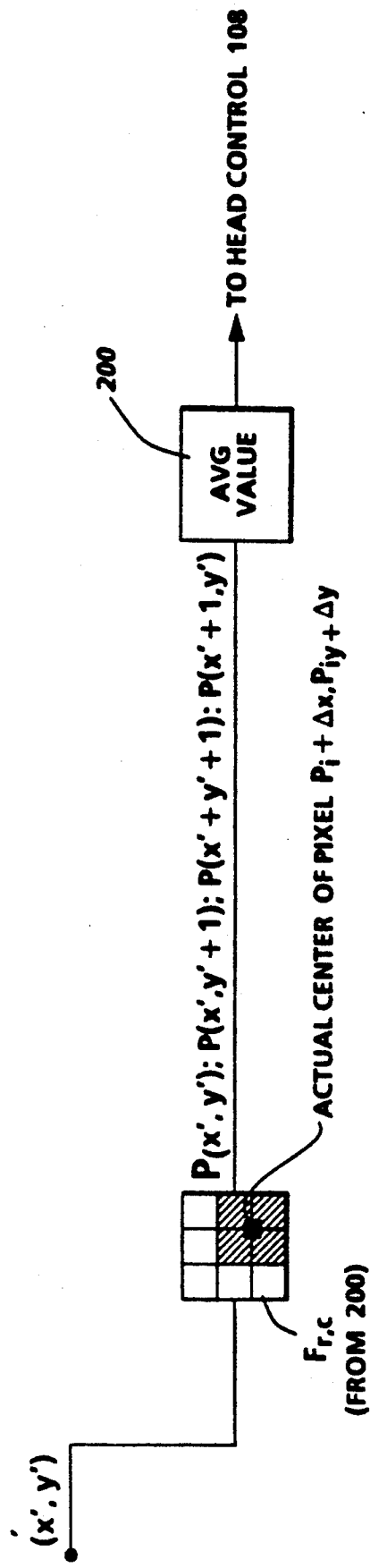

As an alternative, and with reference to FIG. 7A, and as shown in FIG. 7B because it must be recognized that truncation or rounding has certain undesirable effects on the image output, since ions forming the pixel do not land at the center of the pixel, x',y', values from four pixels neighboring the landing location are derived from $F_{r,c}$, and their values averaged at averager 220. The output value is then the average value of the four neighboring pixels from the future pixels and is directed to head control 108 (FIG. 3). This value is a better representation of the future pixel value in a gray system, since the average value of four pixels is likely to be a gray value.

As yet another alternative, and not shown in any of the Figures, an untruncated value $P_{ix} + \Delta x$ and $P_{iy} + \Delta y$ may be used to derive a weighted value for the output pixel, depending on the distance of the center of the displaced pixel to any of the centers of four neighbors, the maximum number of pixels that the displaced pixel will overlap.

In an alternative embodiment, it might be appreciated that the actual or uncorrected printed image is the desired image, with some additional number of scan lines or pixels (due to the blooming artifact). Accordingly, it might be said that the image is simply somewhat larger in the x and y directions, than desired, whenever there are previous pixels affecting the later deposited pixels. Accordingly, an alternative method of pre-correcting the data, well within the contemplation of the invention, which uniformly calculates and accounts for previous deposited pixels, might be expressed by the equations $$\Delta y = K_y - \Sigma_{r,c} \beta_{r,c} O_{r,c} \quad (5)$$

and $$\Delta x = K_x - \Sigma_{r,c} \alpha_{r,c} O_{r,c} \quad (6)$$

Where
- $\Delta y$ and $\Delta x$ are, respectively, displacement in slow scan and fast scan directions on the imaging surface;
- $K_y$ and $K_x$ are constant, accounting for the maximum amount of blooming in slow scan and fast scan directions on the imaging surface
- $\beta$ is the measured coefficient of force on pixel $P_i$ by each previously deposited pixel, or the displacement term, in the y direction;
- $\alpha$ is the measured coefficient of force on pixel $P_i$ by each previously deposited pixel, or the displacement term, in the x direction;
- r and c are, respectively, rows and columns in the matrix O; and O is the occupancy matrix, which represents the value of a pixel at a given position in the matrix.

Thus it can be seen that the image will be started late (offset in the y direction), or offset laterally, by some amount (offset in the x direction) by some distance $K_x$ or $K_y$, whenever there are no pixels in $O_{r,c}$. However, when either $\beta_{r,c} O_{r,c}$ or $\alpha_{r,c}$ is at a maximum, indicating the maximum amount of blooming, $\Delta y$ and $\Delta x$ will be zero, indicating no delay. Thus, after displacement determination, the value of the pixel identified as landing at a selected location $P_{ix}+\Delta x$ and $P_{iy}+\Delta y$ is stored for printing at that location. The result over an example solid area is that the first pixels, which are not affected by the blooming artifact, are printed at the location $P_{ix1}+K_x$ and $P_{iy1}+K_y$. Later, the Nth pixels are directed to locations $P_{ixN}'0$, $P_{iyN}+0$, but land at positions $P_{ixN}+K_x$ and $P_{iyN}+K_y$. Accordingly, an image has a size determined by the limitations $(P_{ix1}+K_x)-(P_{ixN}+K_x)$, and $(P_{iy1}+K_x)-(P_{iN}+K_x)$. Thus it can be seen that errors $K_x$ and $K_y$ cancel out, leaving the image as the same size.

While the invention has been described providing correction for a 1:1 input to output resolution ratio, there is no such requirement. Advantageous results may be obtained if the output resolution in the process (or slow scan direction) is higher than the input resolution. Further, while the described embodiment assumes that the blooming function operating on the ions trajectories can be described as a linear function, for certain devices which had high amounts of blooming, the function may be described as a nonlinear one. In such a case, a non-linear filter may be applied to the process, to correct for the non-linear components of the blooming function.

The invention has been described with reference to a preferred embodiment. Obviously modifications will occur to others upon reading and understanding the specification taken together with the drawings. Various alternatives modifications, variations or improvements may be made by those skilled in the art from this teaching which are intended to be encompassed by the following claims.

We claim:

1. In an imaging device for printing an image from a bitmap defined by scan lines of pixels, each pixel having a pixel value representing an optical density of the image at a pixel location in the bitmap, including a source of ions, means for moving ions towards a moving imaging surface to create a pattern of charge thereon, modulation means to modulate the moving ions in accordance with a bitmap representing a set of pixels forming the image, for the formation of a latent image corresponding to the bitmap on the imaging surface, and means to alter said latent image to account for an effect of charge previously deposited on the imaging surface on the moving ions subsequently directed to the imaging surface, said altering means including:

a first storage device storing displacement coefficients for locations of pixels within a selected distance from a pixel to be printed each displacement coefficient representing said effect of said charge previously deposited at a location of the pixel within the selected distance, on said ions to be subsequently directed to the location of the pixel where the pixel will be printed;

a second storage device storing at least a portion of the bitmap of the image, the stored portion of the bitmap including a set of pixels previously printed, a set of pixels to be subsequently printed, and a current pixel to be printed;

means for multiplying each displacement coefficient for a pixel location with a corresponding pixel value in the bitmap that has been previously printed, and summing all said multiplied pixel values within said selected distance, to determine a displacement vector representing a distance and direction by which said ions to be subsequently deposited at the location where the current pixel will be printed, are displaced;

means for identifying from the second storage device a future pixel value in the bitmap at a pixel location corresponding to the location at which said ions will be deposited for the pixel will be printed; and means controlling the modulation means to modulate the moving ions for the current pixel to be printed in accordance with the future pixel value.

2. The device as defined in claim 1, wherein said first storage device stores displacement coefficients for a selected area including N scan lines, and M pixels in each of the N scan lines, where M and N are selected to reflect the total number of pixel locations at which deposited ions have a substantial effect on ions to be deposited at a pixel location to be printed.

3. The device as defined in claim 1, wherein said first storage device stores pixel values for a selected area of the image including N scan lines, where N scan lines approximately correspond to the distance between the modulation means and the imaging surface.

4. The device as defined in claim 3, wherein said first storage device stores pixel values for a selected area including M pixels in each of the N scan lines, where M pixels reflects the total number of pixel locations in each of N scan lines at which deposited ions have a substantial effect on a ions to be deposited at a pixel location to be printed.

5. The device as defined in claim 1, wherein the stored portion of the bitmap including a set of pixels previously printed includes D scan lines of pixels, where D scan lines of pixels is approximately the distance between the modulation means and the imaging surface.

6. The device as defined in claim 1, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

7. The device as defined in claim 6, wherein D is approximately 5 scan lines.

8. The device as defined in claim 1, wherein the stored portion of the bitmap including a set of pixels to be subsequently printed, includes F scan lines of pixels, where F scan lines corresponds to the possible displacement of ions to be deposited at a pixel location to be printed.

9. The device as defined in claim 8, wherein F is approximately 3 scan lines.

10. The device as defined in claim 1, wherein the stored portion of the bitmap including the set of pixels previously printed includes a current scan line of previously printed pixels, and the set of pixels to be subsequently printed includes the current scan line of pixels to be subsequently printed, and the pixel to be printed.

11. The device as defined in claim 1, wherein said second storage device includes a spiral shift register, storing scan lines of pixels including the set of pixels previously printed, and allowing each pixel in each of the scan lines to be shifted therethrough, in accordance with a positional relationship with the pixel to be printed, to a position in the register at which said means for multiplying each displacement coefficient for a pixel position with a corresponding pixel value in the bitmap that has been previously printed operates on the pixel.

12. The device as defined in claim 11, wherein the stored portion of the bitmap including a set of pixels previously printed includes D scan lines of pixels, where D scan lines of pixels is approximately the distance between the modulation means and the imaging surface.

13. The device as defined in claim 11, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

14. The device as defined in claim 13, wherein D is approximately 5 scan lines.

15. The device as defined in claim 1, wherein said second storage device includes a spiral shift register storing scan lines of pixels, including the set of pixels to be subsequently printed, and allowing each pixel in each of the scan lines to be shifted therethrough, in accordance with a positional relationship with the pixel to be printed, to a position in the register at which said means for identifying a future pixel value operates on the pixel.

16. The device as defined in claim 15, wherein the stored portion of the bitmap including a set of pixels to be subsequently printed, includes F scan lines of pixels, where F scan lines corresponds to the possible displacement of ions.

17. The device as defined in claim 16, wherein F is approximately 3 scan lines.

18. The device as defined in claim 1, wherein said second storage device comprises a spiral shift register storing scan lines of pixels, including the set of pixels previously printed, and the set of pixels to be subsequently printed, the spiral shift register allowing each pixel in each of the scan lines to be shifted therethrough, in accordance with a positional relationship to the pixel to be printed, to a position in the register at which said means for multiplying each displacement coefficient for a pixel position with a corresponding pixel value in the bitmap that has been previously printed operates on the pixel, and to a position in the register at which said means for identifying operates on the pixel.

19. The device as defined in claim 18, wherein the stored portion of the bitmap including the step of pixels previously printed pixels includes a current scan line of previously printed pixels, and the set of pixels to be subsequently printed includes the current scan line of pixels to be subsequently printed, and the pixel to be printed.

20. In an imaging device for printing an image from a bitmap defined by scan lines of pixels, each pixel having a pixel value representing an optical density of the image at a pixel location in the bitmap, including a source of ions, means for moving ions towards a moving imaging surface to create a pattern of charge thereon, modulation means to modulate the moving ions in accordance with a bitmap representing a set of pixels forming image, for the formation of a latent image corresponding to the bitmap on the imaging surface, and means to alter an image to account for an effect of charge previously deposited on the imaging surface on the ions subsequently directed to the imaging surface, said altering means including:

a first storage device storing displacement coefficients for locations of pixels within a selected distance from a pixel to be printed each displacement coefficient representing an effect of said charge previously deposited at the pixel location within the selected distance, on said ions to be subsequently directed to the pixel location where the pixel will be printed;

a second storage device storing at least a portion of the bitmap of the image, the stored portion of the bitmap including a set of pixels previously printed, a set of pixels to be subsequently printed, and a current pixel to be printed;

means for multiplying each displacement coefficient for a pixel location with a corresponding pixel value in the bitmap that has been previously printed, and summing all said multiplied pixel values within said selected distance, to determine a displacement vector representing a distance and direction by which said ions to be subsequently deposited at the pixel location where the pixel will be printed, are said, means for identifying from the second means a set of pixel values in the bitmap to be subsequently printed, the set including a pixel value corresponding to the pixel location at which said ions will be deposited for the pixel to be printed, and deriving an average pixel value from said set of pixel values; and controlling said modulation means to modulate the moving ions for the current pixel to be printed in accordance with the average value.

21. The device as defined in claim 20, wherein said first storage device stores displacement coefficients for a selected area including N scan lines, and M pixels in each of the N scan lines, where M and N are selected to reflect the total number of pixel locations at which deposited ions have a substantial effect on ions to be deposited at a pixel location to be printed.

22. The device as defined in claim 20, wherein said first storage device stores pixel values for a selected area of the image including N scan lines, where N scan lines approximately corresponds to the distance between the modulation means and the imaging surface.

23. The device as defined in claim 22, wherein said first storage device stores pixel values for a selected area including M pixels in each of the N scan lines, where M pixels reflects the total number of pixel locations in each of N scan lines at which deposited ions have a substantial effect on a ions to be deposited at a pixel location to be printed.

24. The device as defined in claim 20, wherein the stored portion of the bitmap including a set of pixels previously printed includes D scan lines of pixels, where D scan lines of pixels is approximately the distance between the modulation means and the imaging surface.

25. The device as defined in claim 20, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

26. The device as defined in claim 25, wherein D is approximately 5 scan lines.

27. The device as defined in claim 20, wherein the stored portion of the bitmap including a set of pixels to be subsequently printed, includes F scan lines of pixels, where F scan lines corresponds to the possible displacement of ions to be deposited at a pixel location to be printed.

28. The device as defined in claim 27, wherein F is approximately 3 scan lines.

29. The device as defined in claim 20, wherein the stored portion of the bitmap including the set of pixels previously printed pixels includes a current scan line of previously printed pixels, and the set of pixels to be subsequently printed includes the current scan line of pixels to be subsequently printed, and the pixel to be printed.

30. The device as defined in claim 20, wherein said second storage device includes a spiral shift register, storing scan lines of pixels including the set of pixels previously printed, and allowing each pixel in each of the scan lines to be shifted therethrough, in accordance with a positional relationship with the pixel to be printed, to a position in the register at which said means for multiplying each displacement coefficient for a pixel position with a corresponding pixel value in the bitmap that has been previously printed operates on the pixel.

31. The device as defined in claim 30, wherein the stored portion of the bitmap including a set of pixels previously printed includes D scan lines of pixels, where D scan lines of pixels is approximately the distance between the modulation means and the imaging surface.

32. The device as defined in claim 30, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

33. The device as defined in claim 32, wherein D is approximately 5 scan lines.

34. The device as defined in claim 20, wherein said second storage device includes a spiral shift register storing scan lines of pixels, including the set of pixels to be subsequently printed, and allowing each pixel in each of the scan lines to be shifted therethrough, in accordance with a positional relationship with the pixel to be printed, to a position in the register at which said means for identifying a future pixel value operates on the pixel.

35. The device as defined in claim 34, wherein the stored portion of the bitmap including a set of pixels to be subsequently printed, includes F scan lines of pixels, where F scan lines corresponds to the possible displacement of ions.

36. The device as defined in claim 35, wherein F is approximately 3 scan lines.

37. The device as defined in claim 20, wherein said second storage device comprises a spiral shift register storing scan lines of pixels, including the set of pixels previously printed, and the set of pixels to be subsequently printed, the spiral shift register allowing each pixel in each of the scan lines to be shifted therethrough, in accordance with a positional relationship to the pixel to be printed, to a position in the register at which said means for multiplying each displacement coefficient for a pixel position with a corresponding pixel value in the bitmap that has been previously printed operates on the pixel, and to a position in the register at which said means for identifying operates on the pixel.

38. The device as defined in claim 18, wherein the stored portion of the bitmap including the set of pixels previously printed pixels includes a current scan line of previously printed levels, and the set of pixels to be subsequently printed includes the current scan line of pixels to be subsequently printed, and the pixel to be printed.

39. In an imaging device for printing an image from a bitmap defined by scan lines of pixels, each pixel having a pixel value representing an optical density of the image at a pixel location in the bitmap, including a source of ions, means for moving ions towards a moving imaging surface to create a pattern of charge thereon, modulation means to modulate the moving ions in accordance with a bitmap representing a set of pixels forming image, for the formation of a latent image corresponding to the bitmap on the imaging surface, means for controlling said modulation in accordance with said bitmap, and means to alter an image to account for an effect of ions previously deposited on the imaging surface on the moving charge subsequently directed to the imaging surface, said altering means including:

means storing, for pixel locations within a selected area, a set of displacement coefficients representing the effect of charge previously deposited thereat on said ions to be deposited at location of a pixel to be printed;

means storing a set of pixel values representing a portion of the bitmap of the image, including previously deposited pixel values at locations within the selected area, and future pixel values at locations to which said ions will be deflected;

means determining the future location to which ions to be deposited at the pixel location to be printed will be displaced as a function of the stored displacement coefficients and the stored pixel values for pixels in the selected area;

means identifying from the pixel value storing means, a future pixel value in the bitmap at a future pixel location corresponding to the pixel location at which said ions will be deposited for the pixel to be printed; and said modulation controlling means controlling modulation of said pixel to be printed in accordance with the identified future pixel value.

40. The device as claimed in claim 39, wherein said displacement coefficient storing means stores displacement coefficients for a selected area including N scan lines, and M pixels in each of the N scan lines, where M and N are selected to reflect the total number of pixel locations at which deposited ions have a substantial effect on ions to be deposited at a pixel location to be printed.

41. The device as defined in claim 39, wherein said displacement coefficient storing means stores pixel values for a selected area of the image including N scan lines, where N scan lines approximately corresponds to the distance between the modulation means and the imaging surface.

42. The device as defined in claim 41, wherein said displacement coefficient storing means stores pixel values for a selected area including M pixels in each of the N scan lines, where M pixels reflects the total number of pixel locations in each of N scan lines at which deposited ions have a substantial effect on a ions to be deposited at a pixel location to be printed.

43. The device as defined in claim 39, wherein the stored portion of the bitmap including a set of pixels previously printed includes D scan lines of pixels, where D scan lines of pixels is approximately the distance between the modulation means and the imaging surface.

44. The device as defined in claim 39, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

45. The device as defined in claim 44, wherein D is approximately 5 scan lines.

46. The device as defined in claim 39, wherein the stored portion of the bitmap including a set of pixels to be subsequently printed, includes F scan lines of pixels, where F scan lines corresponds to the possible displacement of ions to be deposited at a pixel location to be printed.

47. The device as defined in claim 46, wherein F is approximately 3 scan lines.

48. The device as defined in claim 39, wherein the stored portion of the bitmap including the set of pixels previously printed includes a current scan line of previously printed pixels, and the set of pixels to be subsequently printed includes the current scan line of pixels to be subsequently printed, and the pixel to be printed.

49. The device as defined in claim 39, wherein said second storage device includes a spiral shift register, storing scan lines of pixels including the set of pixels previously printed, and allowing each pixel in each of the scan lines to be shifted therethrough, in accordance with a positional relationship with the pixel to be printed, to a position in the register at which said means for multiplying each displacement coefficient for a pixel position with a corresponding pixel value in the bitmap that has been previously printed operates on the pixel.

50. The device as defined in claim 39, wherein the stored portion of the bitmap including a set of pixels previously printed includes D scan lines of pixels, where D scan lines of pixels is approximately the distance between the modulation means and the imaging surface.

51. The device as defined in claim 39, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

52. The device as defined in claim 51, wherein D is approximately 5 scan lines.

53. The device as defined in claim 39, wherein said second storage device includes a spiral shift register storing scan lines of pixels, including the set of pixels to be subsequently printed, and allowing each pixel in each of the scan lines to be shifted therethrough, in accordance a positional relationship with the pixel to be printed, to a position in the register at which said means for identifying a future pixel value operates on the pixel.

54. The device as defined in claim 53, wherein the stored portion of the bitmap including a set of pixels to be subsequently printed, includes F scan lines of pixels, where F scan lines corresponds to the possible displacement of ions.

55. The device as defined in claim 54, wherein F is approximately 3 scan lines.

56. The device as defined in claim 39, wherein said second storage device comprises a spiral shift register storing scan lines of pixels, including the set of pixels previously printed, and the set of pixels to be subsequently printed, the spiral shift register allowing each pixel in each of the scan lines to be shifted therethrough, in accordance with a positional relationship to the pixel to be printed, to a position in the register at which said means for multiplying each displacement coefficient for a pixel position with a corresponding pixel value in the bitmap that has been previously printed operates on the pixel, and to a position in the register at which said means for identifying operates on the pixel.

57. The device as defined in claim 56, wherein the stored portion of the bitmap including the set of pixels previously printed pixels includes a current scan line of previously printed pixels, and the set of pixels to be subsequently printed includes the current scan line of pixels to be subsequently printed, and the pixel to be printed.

58. A method for altering an image to account for an effect of ions previously deposited on an imaging surface on charge subsequently directed to the imaging surface, in an imaging device for printing an image from a bitmap defined by scan lines of pixels, each pixel having a pixel value representing an optical density of the image at a pixel location in the bitmap, including a source of said ions, means for moving said ions towards a moving imaging surface to create a pattern of said charge thereon, and modulation means to modulate the moving ion in accordance with a bitmap representing a set of pixels forming image, for a formation of a latent image corresponding to the bitmap, including the steps of:

storing, for pixel locations within a selected area, a set of displacement coefficients representing the effect of charge previously deposited thereat on said ions to be deposited at the pixel location to be printed;

storing a set of pixel values representing a portion of the bitmap of the image, including previously deposited pixel values at locations within the selected area, and future pixel values at locations to which said ions will be deflected;

determining the future pixel location to which said ions to be deposited at the pixel location to be printed will be displaced as a function of the stored displacement coefficients and the stored pixel values for pixels in the selected area;

identifying from the pixel value storing means, a future pixel value in the bitmap at a future pixel location corresponding to the location at which said ions will be deposited for the pixel to be printed; and controlling modulation of said modulation means for the pixel to be printed in accordance with the identified future pixel value.

59. The method as defined in claim 58, displacement coefficients are stored for a selected area including N scan lines, and M pixels in each of the N scan lines, where M and N are selected to reflect the total number of pixel locations at which deposited ions have a substantial effect on ions to be deposited at a pixel location to be printed.

60. The method as defined in claim 58, wherein said displacement coefficients are stored for a selected area of the image including N scan lines, where N scan lines approximately corresponds to the distance between the modulation means and the imaging surface.

61. The method as defined in claim 60, wherein said displacement coefficients are stored for a selected area including M pixels in each of the N scan lines, where M pixels reflects the total number of pixel locations in each of N scan lines at which deposited ions have a substantial effect on a ions to be deposited at a pixel location to be printed.

62. The method as defined in claim 58, wherein the stored portion of the bitmap including a set of pixels previously printed includes D scan lines of pixels, where D scan lines of pixels is approximately the distance between the modulation means and the imaging surface.

63. The method as defined in claim 58, wherein the stored portion of the bitmap including a set of pixels previously printed includes D scan lines of pixels, where D scan lines of pixels is approximately a maximum distance at which deposited ions have a substantial effect on ions to be deposited at a pixel location to be printed.

64. The method as defined in claim 63, wherein D is approximately 5 scan lines.

65. The device as defined in claim 58, wherein the stored portion of the bitmap including a set of pixels to be subsequently printed, includes F scan lines of pixels, where F scan lines corresponds to the possible displacement of ions to be deposited at a pixel location to be printed.

66. The device as defined in claim 65, wherein F is approximately 3 scan lines.

67. The device as defined in claim 66, wherein the stored portion of the bitmap including the set of pixels previously printed includes a current scan line of previously printed pixels, and the set of pixels to be subsequently printed includes the current scan line of pixels to be subsequently printed, and the pixel to be printed.

68. An imaging device for printing an image, including a source of ions, means for moving said ions towards an imaging surface to create a pattern of charge thereon, modulation means to modulate the moving ions to allow the selective deposit of ions on the imaging surface in imagewise configuration, and means to correct the image for an effect of previously select deposited ions on ions to be subsequently deposited, said correction means including:

means for determining at least a substantial portion of the effect of previously selective deposited ions on ions to be deposited, to determine an amount of displacement on the imaging surface of said ions to be deposited;

means for comparing the amount of displacement of said ions to be deposited with a desired imagewise configuration of charge at a displacement location on the image surface; and means for controlling said modulation means to allow said selective deposit of ions in accordance with the desired imagewise configuration of charge at the displacement location on the image surface.

69. In an ionographic imaging device for printing an image represented by a bitmap defined by scan lines of pixels, each pixel having a pixel value representing an optical density of the image at a pixel location in the bitmap, including a source of ions, means for moving said ions in a stream towards a moving imaging surface moving in a process direction to create a pattern of charge thereon, modulation means to modulate the moving ions in accordance with a set of pixels forming image, for the formation of a latent image on the imaging surface, said modulation means modulating said moving ions to form a scan line of pixels on the imaging surface extending in a cross process direction and means to alter an image to account for an effect of charge previously deposited on the imaging surface on the ions subsequently directed to the imaging surface, said altering means including:

a first memory storing a first set of displacement coefficients for a set of previously printed pixel locations near the pixel to be printed, the first set of displacement cofficients representing a displacement effect in a booming direction, opposite and parallel to the process direction, of said charge previously deposited at members of the set of pixel locations;

a second memory storing a second set of displacement coefficients for the set of previously printed pixel locations generally near the pixel to be printed, the second set of displacement coefficients representing a displacement effect in a cross scan line direction, of said charge previously deposited at members of the set of pixel locations;

a third memory storing at least a portion of the bitmap of the image, the stored portion of the bitmap including a set of previously printed pixels near the pixel to be printed, a set of pixels to be subsequently printed, and the pixel to be printed;

means for identifying in the third memory the pixel values for the set of previously printed pixels near the pixel to be printed;

means for multiplying each displacement coefficient for a pixel location with a corresponding pixel value to derive a displacement value in each of the blooming direction and scan line directions, for each pixel;

means for summing all said multiplied pixel values for the set of previously printed pixels near the pixel to be printed, to determine a displacement in the blooming direction and the scan line direction by which said ions to be be printed, will be displaced;

means for deriving a displacement location by adding the displacement values to the current pixel position;

means for identifying from the third memory a future pixel value in the bitmap at the displacement pixel location; and means controlling said modulation means to modulate the moving ions for the pixel to be printed in accordance with the future pixel value.

70. The device as defined in claim 69, wherein pixels in the bitmap are incrementally advanced through said third memory in accordance with the pixel to be printed.

71. An imaging device for printing an image, including a source of ions, means for moving said ions towards an imaging surface to create a pattern of charge thereon, modulation means to modulate the moving ions to allow a selective deposit of ions on the imaging surface in imagewise configuration, and means to correct the image for an effect of previously deposited ions on ions to be subsequently deposited, said correction means including:

means for determining at least a substantial portion of the effect of previously selective deposited ions on said ions to be deposited, to determine an amount of displacement on the imaging surface of said ions to be deposited;

means for determining an imagewise configuration of charge to be deposited on the imaging surface, in accordance with the determined effect of previously selective deposited ions on said ions to be deposited, said determining means operating to displace, in said configuration, ions unaffected by previously selective deposited ions, by distances corresponding to the displacement of said ions effected by previously selective deposited ions, means for controlling said modulation means to allow said selective deposit on said image surface of ions in accordance with a determined imagewise configuration of charge.

72. The device as defined in claim 71, wherein said determining means operated to displace ions in accordance with the functions $$\Delta y = K_y - \Sigma_{r,c} \beta_{r,c} O_{r,c} \tag{5}$$

and $$\Delta x = K_x - \Sigma_{r,c} \alpha_{r,c} O_{r,c} \tag{6}$$

Where $\Delta y$ and $\Delta x$ are, respectively, displacement in slow scan and fast scan directions on the imaging surface;

$K_y$ and $K_x$ are constants, accounting for the maximum amount of blooming in slow scan and fast scan directions on the imaging surface;

$\beta$ is the measured coefficient of force on pixel $P_i$ by each previously deposited pixel, or the displacement term, in the y direction;

$\alpha$ is the measured coefficient of force on pixel $P_i$ by each previously deposited pixel, or the displacement term, in the x direction;

r and c are, respectively, rows and columns in the matrix O; and O is the occupancy matrix, which represents the value of a pixel at a given position in the matrix.

* * * * *